United States Patent
Cai et al.

(10) Patent No.: US 6,572,783 B1
(45) Date of Patent: *Jun. 3, 2003

(54) VINYL CROSSLINKED OXYGEN SCAVENGING COMPOSITIONS AND METHODS OF PREPARING THE SAME

(75) Inventors: Gangfeng Cai, Danville, CA (US); Ta Yen Ching, Novato, CA (US); Hu Yang, San Ramon, CA (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 151 days.

This patent is subject to a terminal disclaimer.

(21) Appl. No.: 09/722,374

(22) Filed: Nov. 27, 2000

(51) Int. Cl.$^7$ .......................... B01J 20/26; B01J 23/00; C09K 15/04; C09K 15/06

(52) U.S. Cl. .............................. 252/188.28; 428/34.7; 428/35.2

(58) Field of Search ............... 428/35.9, 35.7, 428/36.7, 479.6; 427/35.7, 35.8, 35.9, 349, 516, 35.2, 35.3; 252/188.28, 188.1, 397; 229/100; 502/159; 526/348, 308

(56) References Cited

U.S. PATENT DOCUMENTS

| | | | |
|---|---|---|---|
| 3,497,571 A | 2/1970 | Tellier et al. | 260/844 |
| 3,536,687 A | 10/1970 | Nordstrom | 260/89.5 |
| 4,415,710 A | 11/1983 | Barnabeo et al. | 525/370 |
| 4,524,201 A | 6/1985 | Barnabeo et al. | 528/395 |
| 4,694,029 A | 9/1987 | Land | 522/8 |
| 5,116,916 A | 5/1992 | Young | 525/350 |
| 5,211,875 A | 5/1993 | Speer et al. | 252/188.28 |
| 5,212,210 A | 5/1993 | Halm | 522/24 |
| 5,346,644 A | 9/1994 | Speer et al. | 252/188.28 |
| 5,425,896 A | 6/1995 | Speer et al. | 252/188.28 |
| 5,466,756 A | 11/1995 | Roach et al. | 525/330.6 |
| 5,498,364 A | 3/1996 | Speer et al. | 252/188.28 |
| 5,627,239 A | 5/1997 | Ching et al. | 525/330.6 |
| 5,641,825 A | 6/1997 | Bacskai et al. | 524/398 |
| 5,656,692 A | 8/1997 | Hayes | 525/63 |
| 5,660,761 A | 8/1997 | Katsumoto et al. | 252/188.28 |
| 5,700,554 A | 12/1997 | Speer et al. | 428/220 |
| 5,736,616 A | 4/1998 | Ching et al. | 525/330.3 |
| 5,776,361 A | 7/1998 | Katsumoto et al. | 252/188.28 |
| 5,837,158 A | 11/1998 | Shepodd et al. | 252/181.6 |
| 5,859,145 A | 1/1999 | Ching et al. | 525/330.6 |
| 5,885,481 A | 3/1999 | Venkateshwaran et al. | 252/188.28 |
| 6,020,455 A | 2/2000 | Pretzer et al. | 528/307 |
| 6,057,013 A | 5/2000 | Ching et al. | 428/35.7 |
| 6,063,307 A | 5/2000 | Shepodd et al. | 252/181.6 |
| 6,254,803 B1 * | 7/2001 | Matthews et al. | 252/188.1 |
| 6,255,248 B1 * | 7/2001 | Bansleben et al. | 252/188.28 |
| 6,333,087 B1 * | 12/2001 | Jerdee et al. | 229/100 |

FOREIGN PATENT DOCUMENTS

| | | |
|---|---|---|
| DE | 1900181 | 10/1969 |
| EP | 0 418 011 A2 | 3/1991 |
| EP | 0 927 218 B1 | 4/2000 |
| WO | WO99/15433 | 4/1999 |
| WO | WO99/48963 | 9/1999 |

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond*, OSP Conference, pp. 1–8 (Chicago, Jun. 19–20, 2000).

Ching et al., "Tasteless Oxygen Scavenging Polymers: A New Platform Technology for Food Packaging Based On Controlled Oxidation," *Oxygen Absorber . . . 2001 and Beyond*, OSP Conference Slides (Chicago, Jun. 19–20, 2000).

* cited by examiner

*Primary Examiner*—Steven Bos
*Assistant Examiner*—Anthony Kuhar
(74) *Attorney, Agent, or Firm*—Williams, Morgan & Amerson, P.C.

(57) ABSTRACT

The disclosed invention is directed to an oxygen scavenging composition that comprises at least one oxygen scavenging polymer and at least one vinyl crosslinker. The oxygen scavenging polymer comprises a polymeric backbone, at least two backbone crosslinking functional groups that are carbon-carbon double bonds in the backbone and at least one cyclic organic moiety having from 5 to 9 carbon atoms in its ring, and at least one carbon-carbon double bond in its ring. The vinyl crosslinker comprises at least two functional groups that are capable of reacting with the crosslinking functional groups of the oxygen scavenging polymer. Vinyl crosslinkers that can be used include styrene and methyl acrylate, among others.

45 Claims, 1 Drawing Sheet

VINYL CROSSLINKED OXYGEN SCAVENGING COMPOSITIONS AND METHODS OF PREPARING THE SAME

BACKGROUND OF THE INVENTION

1. Field of the Invention

The present invention relates generally to the field of oxygen scavenging materials. More particularly, it concerns vinyl crosslinked oxygen scavenging compositions and methods and components for producing the same.

2. Description of Related Art

It is well known that limiting the exposure of oxygen-sensitive products to oxygen maintains and enhances the quality and shelf-life of the product. For instance, by limiting the oxygen exposure of oxygen sensitive food products in a packaging system, the quality of the food product is maintained, and food spoilage is avoided. In addition, such packaging also keeps the product in inventory longer, thereby reducing costs incurred from waste and restocking. In the packaging industry, several means for limiting oxygen exposure have already been developed, including modified atmosphere packaging (MAP), vacuum packaging and oxygen barrier film packaging.

Another means for limiting oxygen exposure involves incorporating an oxygen scavenger into the packaging structure. Incorporation of a scavenger in the package can provide a uniform scavenging effect throughout the package. In addition, such incorporation can provide a means of intercepting and scavenging oxygen as it is passes through the walls of the package, thereby maintaining the lowest possible oxygen level throughout the package.

While much emphasis is being placed on thermoplastic oxygen scavenging compositions for use in packaging, it would also be desirable to have oxygen scavenging compositions that have a thermoset structure. Such thermoset compositions could permit oxygen scavenging technology to be used in certain contexts (e.g. coatings) in which it would be difficult to use a thermoplastic composition. Furthermore, oxygen scavenging compositions that tend to have inherent barrier properties are also desirable. It would also be beneficial to have oxygen scavenging coatings that can both protect a metal container (e.g. a can) from corrosion, while conferring oxygen scavenging benefits to the oxygen-sensitive contents of the container.

SUMMARY OF THE INVENTION

The present invention is directed to vinyl crosslinked oxygen scavenging compositions, oxygen scavenging polymers that can be reacted with vinyl crosslinkers, and methods of preparing vinyl crosslinked oxygen scavenging coatings.

One aspect of the invention is an oxygen scavenging composition that comprises at least one oxygen scavenging polymer and at least one vinyl crosslinker. The oxygen scavenging polymer comprises a polymeric backbone, at least two backbone crosslinking functional groups that are carbon-carbon double bonds in the backbone and at least one cyclic organic moiety having from 5 to 9 carbon atoms in its ring, and at least one carbon-carbon double bond in its ring. The backbone crosslinking groups are capable of reacting with the vinyl crosslinker. Preferably the backbone carbon-carbon double bonds capable of being crosslinked are in the trans configuration. The vinyl crosslinker comprises at least two functional groups that are capable of reacting with the crosslinking functional groups of the oxygen scavenging polymer. Vinyl crosslinkers that can be used include styrene, divinyl benzene, methyl acrylate, cyclohexenyl methyl acrylate, cyclohexenyl methyl methacrylate, and methyl acrylate, among others.

Cyclohexenyl methyl acrylate or cyclohexenyl methyl methacrylate crosslinkers comprise a cyclic organic oxygen scavenging moiety (e.g. cyclohexenyl). Another embodiment of the present invention is an oxygen scavenging composition that comprises a low molecular weight polymer and at least one oxygen scavenging vinyl crosslinker selected from cyclohexenyl methyl acrylate and cyclohexenyl methyl methacrylate, wherein the low molecular weight polymer comprises a polymeric backbone and at least two backbone crosslinking functional groups that are carbon-carbon double bonds (preferably trans double bonds) in the backbone, wherein the low molecular weight polymer has a number average molecular weight between about 500 Mn and about 5000 Mn, and an acid number of between about 5 mg KOH/g and 50 mg KOH/g. Thus, when cyclohexenyl methyl acrylate or cyclohexenyl methyl methacrylate crosslinkers are used in preparing crosslinked oxygen scavenging compositions from a low molecular weight polymer that does not comprise cyclic organic oxygen scavenging moieties, cyclic organic oxygen scavenging moieties (e.g. cyclohexenyl groups) can be introduced into the crosslinked product by the crosslinker.

The present invention involves crosslinking between the backbones of oxygen scavenging polymers. It is preferred that only the backbone carbon-carbon double bonds, (which in certain embodiments of the present invention can be derived from maleic anhydride or fumaric acid) participate in the crosslinking reaction, and that the oxygen scavenging cyclic moiety, particularly its ring double bond, does not participate in the crosslinking reaction. Furthermore it is preferred that oxygen scavenging carried out by compositions of the present invention is such that the chemical reaction does not result in the cleavage of the backbone of the crosslinked oxygen scavenging polymer, or in the release of compounds that can have undesirable organoleptic effects. Furthermore, the composition can be in the form of a coating or an adhesive.

Another aspect of the invention is a method of preparing an oxygen scavenging coating. A coating can be prepared comprising at least one oxygen scavenging polymer and at least one vinyl crosslinker, wherein both the polymer and vinyl crosslinker are as described above. Alternatively, a coating can be prepared comprising at least one low molecular weight polymer and at least one oxygen scavenging vinyl crosslinker, wherein both the polymer and crosslinker are as described above. The vinyl crosslinker can serve both as the monomeric crosslinker and as the solvent in preparing the coating. In certain cases, when neither the vinyl crosslinker nor the polymer is a liquid, the coating formulation can comprise a solvent. The coating formulation is applied to a surface and is then cured. The coating formulation is cured to form a thermoset material. In certain embodiments in which the coating formulation further comprises an oxygen scavenging initiator, the method can further comprise initiating oxygen scavenging.

Still another aspect of the invention is an oxygen scavenging composition comprised of at least one crosslinked oxygen scavenging polymer. The crosslinked oxygen scavenging polymer comprises a polymeric backbone, at least one cyclic organic moiety having from 5 to 9 carbon atoms and at least one carbon-carbon double bond in its ring. The crosslinked polymer is the product of a reaction of at least one low molecular weight oxygen scavenging polymer and at least one vinyl crosslinker, the vinyl crosslinker is as described above. The low molecular weight oxygen scavenging polymer has a number average molecular weight of between about 500 Mn and about 5000 Mn, and comprises a polymeric backbone having at least two backbone crosslinking functional groups that are carbon-carbon double bonds in the backbone and a cyclic organic moiety which is the same as is present in the crosslinked oxygen scavenging polymer. Preferably, the backbone crosslinking functional groups are trans configuration carbon-carbon double bonds. The composition can further comprise one or more additional components, as described above.

Another aspect of the invention is an oxygen scavenging polymer, capable of being crosslinked, that is the product of a reaction comprising maleic anhydride and at least one diol. This oxygen scavenging polymer comprises a polymeric backbone and at least two backbone crosslinking functional groups, as described above. It has a number average molecular weight between about 500 Mn and about 5000 Mn. Furthermore, the oxygen scavenging polymer comprises at least one cyclic organic moiety having a formula selected from formula (I), (II) (III), and (IV). Formula (I) is

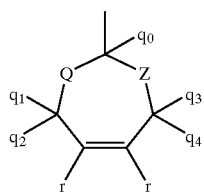

(I)

wherein Q is $-(CR_2R_3)_n-$, n is an integer from 0 to 3, inclusive; wherein Z is $-(CR_4R_5)_e-$, e is an integer from 0 to 3, inclusive; n+e≦3; wherein $q_0$, $q_1$, $q_2$, $q_3$, $q_4$, r, each $R_2$, each $R_3$, each $R_4$, and each $R_5$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents, and when r is hydrogen, at least one of $q_1$, $q_2$, $q_3$, and $q_4$ is hydrogen. Preferably, $q_0$, $q_1$, $q_2$, $q_3$, $q_4$, r, each $R_2$, each $R_3$, each $R_4$, and each $R_5$ are independently selected from hydrogen, methyl and ethyl. Formula (II) is

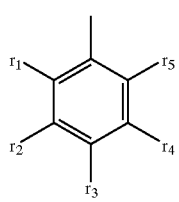

(II)

wherein $r_1$, $r_2$, $r_3$, $r_4$, and $r_5$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents. Preferably, $r_1$, $r_2$, $r_3$, $r_4$, and $r_5$ are independently selected from hydrogen, methyl, and ethyl. Formula (III) is

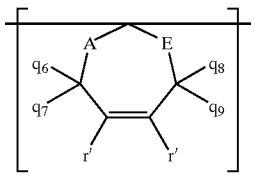

(III)

wherein A is $-(CR_5R_6)_g-$, g is an integer from 0 to 3, inclusive; wherein E is $-(CR_7R_8)_p-$, p is an integer from 0 to 3, inclusive; g+p≦3; wherein $q_6$, $q_7$, $q_8$, $q_9$, r', each $R_5$, each $R_6$, each $R_7$, and each $R_8$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents, and when r' is hydrogen, at least one of $q_6$, $q_7$, $q_8$, and $q_9$ is hydrogen. Preferably, $q_6$, $q_7$, $q_8$, $q_9$, r', each $R_5$, each $R_6$, each $R_7$, each $R_8$ are independently selected from hydrogen, methyl and ethyl. Formula (IV) is

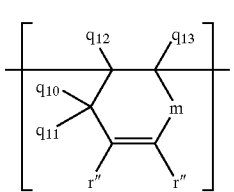

(IV)

wherein m is $-(CR_9R_{10})_h(CR_{11}R_{12})_j-$, wherein the ring carbon adjacent to the double bond is bonded to $R_9$ and $R_{10}$, h is an integer from 0 to 1, inclusive, j is an integer from 0 to 3, inclusive, and when h+j≧1, h is 1; wherein $q_{10}$, $q_{11}$, $q_{12}$, $q_{13}$, r'', $R_9$, $R_{10}$, each $R_{11}$, and each $R_{12}$ are independently selected hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents; and wherein when r'' is hydrogen, at least one of $q_{10}$, $q_{11}$, $R_9$, and $R_{10}$ is hydrogen. Preferably wherein $q_{10}$, $q_{11}$, $q_{12}$, $q_{13}$, r'', $R_9$, $R_{10}$ each $R_{11}$, and each $R_{12}$ are independently selected hydrogen, methyl, and ethyl.

A cyclic organic moiety having any of the formulas, (I), (II), (III), and (IV) can be introduced into the polymer through the diol. In certain embodiments, the oxygen scavenging polymer can be the product of a reaction further comprising cis-1,2,3,6-tetrahydrophthalic anhydride, in addition to the maleic anhydride and the at least one diol. When this is the case, the oxygen scavenging polymer comprises a cyclic organic moiety having formula (IV), as described above, wherein h is 1, j is 0, and wherein $q_{10}$, $q_{11}$, $q_{12}$, $q_{13}$, r'', $R_9$, and $R_{10}$ are hydrogen. This oxygen scavenging polymer can comprise additional cyclic organic moieties introduced into the polymer through the diol having formula (I), (II), (III), or (IV). Preferably this oxygen scavenging polymer that is the reaction product of maleic anhydride and at least one diol has an acid number of between about 5 mg KOH/g and 50 mg KOH/g of oxygen scavenging polymer.

Oxygen scavenging compositions of the present invention are thermoset, and can be useful in certain contexts in which thermoplastic compositions have limited utility. For example, certain thermoset compositions of the present invention can be used as adhesives to join articles or layers together. They can also be particularly useful as coatings for metal containers (e.g. cans).

Certain ordinary (e.g. non-oxygen scavenging) thermoset compositions can be used to treat the surface of a can to protect it from corrosion. Corrosion of a metal food can can cause food contained in it to take on an unpleasant flavor. Metal corrosion can be a particular problem with certain foods that are relatively reactive with metal and that are packaged in metal cans (e.g. carbonated beverages and acidic juices). When certain compositions of the present invention are applied to the inner surfaces of cans, they can help prevent the metal from being corroded, while providing the capacity to scavenge oxygen, thus helping to preserve the oxygen sensitive goods in the container and prolonging their potential shelf life. Increasing a good's shelf life can provide cost savings, in reducing the need to restock and in decreasing waste.

A general advantage of thermoset materials is that they tend to inherently possess good barrier properties (e.g. gas barrier and moisture barrier properties), and certain of the thermoset compositions of the present invention have enhanced barrier properties, because of their added ability to scavenge oxygen. Certain compositions of the present invention could be used to in the field of electronics to protect oxygen sensitive electronic components.

BRIEF DESCRIPTION OF THE DRAWINGS

The following drawing forms part of the present specification and is included to further demonstrate certain aspects of the present invention. The invention may be better understood by reference to this drawing in combination with the detailed description of specific embodiments presented herein.

DESCRIPTION OF ILLUSTRATIVE EMBODIMENTS

Figure 1:
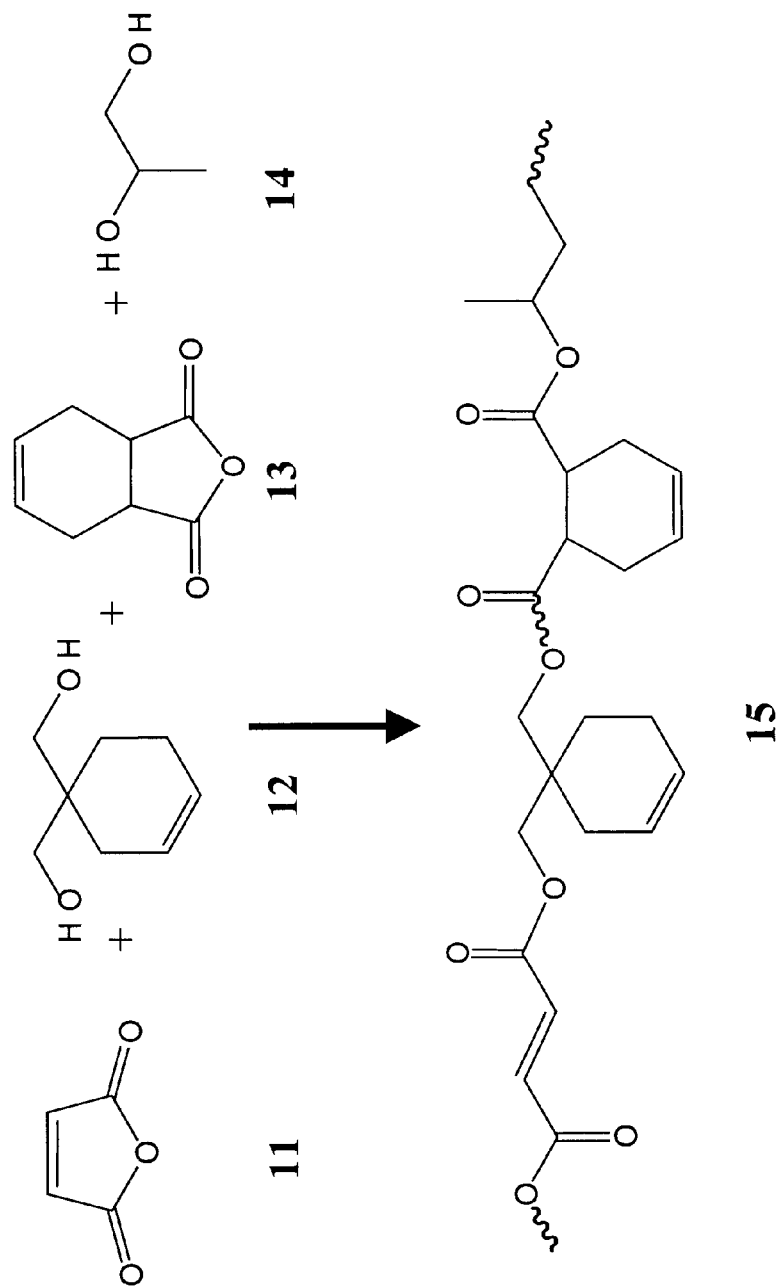
FIG. 1 shows a synthesis scheme for a particular oxygen scavenging polymer of the present invention.

I. The Polymer Capable of Being Crosslinked

Certain embodiments of the present invention are directed to oxygen scavenging compositions that comprise at least one oxygen scavenging polymer and at least one vinyl crosslinker. "At least one oxygen scavenging polymer" includes a plurality of oxygen scavenging polymeric molecules that comprises a single type of polymer molecule or that comprises a mixture of different polymer molecules. Individual oxygen scavenging polymeric molecules of the "at least one oxygen scavenging polymer" comprise a polymeric backbone and at least two backbone crosslinking functional groups that are carbon-carbon double bonds in the backbone and that are capable of reacting with the olefinic functional groups of a vinyl crosslinker. The oxygen scavenging polymer also comprises at least one cyclic organic moiety that has 5 to 9 ring carbon atoms and at least one carbon-carbon double bond in its ring.

The backbone crosslinking functional groups are carbon-carbon double bonds in the polymer backbone that are not in the ring of the at least one cyclic organic moiety, and are preferably in the trans configuration. A preferred configuration of a trans backbone crosslinking group in a polyester backbone is shown in formula (A), below:

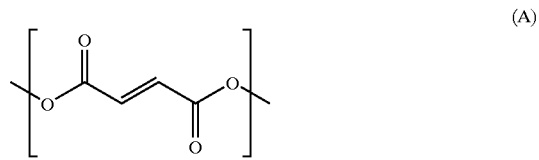

(A)

The polymeric backbone can be selected from polyesters. Preferably the oxygen scavenging polymer has a relatively low molecular weight with a number average molecular weight of less than about 6000 Mn, more preferably it has a number average molecular weight of between about 500 Mn and about 5000 Mn.

The cyclic organic moiety of the oxygen scavenging polymer can be alicyclic or aromatic, preferably the ring is cycloalkenyl. Furthermore, at least one carbon in the ring of the cyclic organic moiety can be part of the polymeric backbone, or the cyclic organic moiety can be pendant to the backbone. When at least one carbon of the cyclic organic moiety's ring is part of the backbone, the cyclic organic moiety will preferably have a formula selected from formula (III) and (IV), described above. Less preferably, the cyclic organic moiety can have the formula (V), below:

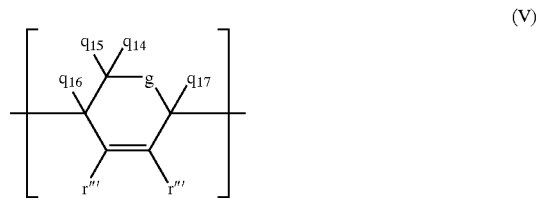

(V)

wherein g is $-(CR_{13}R_{14})_a-$, wherein a is an integer from 0 to 4, inclusive; wherein $q_{14}$, $q_{15}$, $q_{16}$, $q_{17}$, r''', each $R_{13}$, and each $R_{14}$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents; and wherein when r''' is hydrogen at least one of $q_{16}$, and $q_{17}$ is hydrogen. Preferably, $q_{14}$, $q_{15}$, $q_{16}$, $q_{17}$, r''', each $R_{13}$, and each $R_{14}$ are independently selected from H, methyl, and ethyl. When the cyclic organic moiety is pendant to the polymeric backbone it can have the formula (I) or (II), as described above.

Oxygen scavenging polymers that comprise a pendant cyclic organic moiety can further comprise a linking group linking the polymeric backbone and the pendant cyclic organic moiety. The linking group can be selected from the following group: $C_1$–$C_{12}$ alkyls, substituted $C_1$–$C_{12}$ alkyls, $C_1$–$C_{12}$ esters, $C_1$–$C_{12}$ ethers, $C_1$–$C_{12}$ silicones, and linking groups with the formula $-(CH_2)_z-M-(CH_2)_m-$. (M is a moiety comprising oxygen, nitrogen, sulfur, silicon, or any combination thereof. z is an integer from 0 to 12, inclusive, and m is an integer from 0 to 12, inclusive, and when one of z or m is 0, the other is at least 1.).

Preferably the linking group is selected from

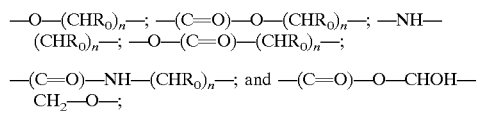

wherein $R_0$ is hydrogen, methyl, ethyl, propyl, or butyl; and n is an integer from 1 to 12, inclusive.

The oxygen scavenging polymer also comprises at least two backbone crosslinking functional groups that are carbon-carbon double bonds in the backbone capable of reacting with functional groups of a vinyl crosslinker. Reaction of the functional groups belonging to the polymer and the crosslinker results in a crosslinked product. Preferably the crosslinking functional groups are positioned along the backbone such that their reaction with the groups of the vinyl crosslinker, results in crosslinking between the polymeric backbones or between the ends of polymers, such that substantially all of the cyclic organic moieties remain intact after the crosslinking reaction. A particularly preferred class of oxygen scavenging polymer is polyesters. Preferably, the oxygen scavenging polymer has an acid number of between about 5 mg KOH/g and 50 mg KOH/g.

One particular oxygen scavenging polymer of the present invention that is capable of being crosslinked, is the product of the reactants maleic anhydride and at least one diol, as described above. As stated above, backbone trans carbon-carbon double bonds are preferred crosslinking functional groups. In certain embodiments, fumaric acid can be substituted for maleic anhydride in producing a polymer that can be crosslinked. Polyesters that are reaction products of fumaric acid and diol have trans double bonds, while those that are the reaction product of maleic anhydride and diol can have both cis and trans carbon-carbon double bonds in the polymeric backbone. Trans carbon-carbon double bonds in the polymer backbone are preferred for crosslinking because they are highly reactive; cis carbon-carbon double bonds are essentially inert in the crosslinking reaction. However, maleic anhydride is preferred in making polyesters of the present invention despite the fact that some of the backbone carbon-carbon double bonds in the product polyester can be in the cis configuration, because the polyester-producing reaction with fumaric acid requires a higher temperature due to the higher melting point of fumaric acid. An unsaturated polyester of the present invention that is the product of a reaction comprising maleic anhydride and at least one diol has more than 85% of the double bonds in trans configuration. High reaction temperature, long reaction time and addition of certain catalysts (e.g., p-toluenesulfonic acid and certain amines) can increase the percentage of trans double bonds in unsaturated polyesters of the present invention.

Preferably, oxygen scavenging polymers that are products of a reaction comprising maleic anhydride and at least one diol, comprise a polymeric backbone and at least two backbone crosslinking functional groups which are backbone carbon-carbon double bonds derived from maleic anhydride, preferably in the trans configuration. Furthermore such oxygen scavenging polymers have a number average molecular weight between about 500 Mn and about 5000 Mn. Preferably, this oxygen scavenging polymer has an acid number between about 5 mg KOH/g and about 50 mg KOH/g. Furthermore, such an oxygen scavenging polymer comprises at least one oxygen scavenging cyclic moiety, having a formula selected from formula (I), (II), (III), (IV) and (V), described above. Preferably between about 2 and 16 wt. % of the total —CH═CH— units in the oxygen scavenging polymer are those present in the oxygen scavenging, cyclic moieties, while the remainder of the —CH═CH— units are present in the polymeric backbone of the uncrosslinked oxygen scavenging polymer. Formulas (I), (II), (III) and (IV) are preferred formulas for the cyclic organic moiety in this oxygen scavenging polymer. When the cyclic organic moiety has formula (I) or (II), the oxygen scavenging polymer can further comprise a linking group, linking the pendant cyclic organic moiety to the backbone, as described above. The cyclic organic moiety of this polymer can be introduced into the polymer through the diol (e.g. 3-cyclohexene-1,1-dimethanol) that is reacted, or if the reaction further comprises cis-1,2,3,6 tetrahydrophthalic anhydride, the cyclic organic moiety can be introduced into the polymer through this anhydride, or cyclic organic moieties can be introduced through cis-1,2,3,6 tetrahydrophthalic anhydride and a diol comprising a cyclic organic moiety both being reactants with maleic anhydride.

Oxygen scavenging polyesters that are the reaction product of maleic anhydride and at least one diol, as described above, comprise at least two types of carbon-carbon double bonds: (1) double bonds derived from maleic anhydride that are in the polymer backbone, and (2) double bonds that are in the ring of the cyclic organic moiety that is introduced into the oxygen scavenging polymer through a diol, diacid, and/or anhydride reacted with maleic anhydride. The first type of bond (e.g. crosslinking functional group), particularly when in the trans configuration in the backbone, is very reactive and copolymerizes with a vinyl monomer/crosslinker easily to form a crosslinked composition. The second type of double bond in the ring of the cyclic organic moiety is much less reactive than the first type of bond, and most of these bonds do not participate in the crosslinking reaction. The purpose of the second type of double bond in the crosslinked composition is to scavenge oxygen.

FIG. 1 shows one suitable synthesis of an oxygen scavenging polymer of the present invention, in which the cyclic organic moiety is introduced through both cis-1,2,3,6 tetrahydrophthalic anhydride and the diol. The backbone crosslinking functional groups of the oxygen scavenging polymer are the result of the reaction of maleic anhydride with a diol. Maleic anhydride 11, cis-1,2,3,6 tetrahydrophthalic anhydride 13, and diols are reacted to form the oxygen scavenging polyester 15. The reacted diacids/anhydrides and diols include maleic anhydride 11, 3-cyclohexene-1,1-dimethanol 12, cis-1,2,3,6-tetrahydrophthalic anhydride 13, and 1,2-propanediol 14. Typical reaction conditions for making unsaturated polyester can include maintaining the reaction at a temperature of between about 180° C. and 240° C. for between about 4 and 20 hours. The molecular weight of the oxygen scavenging polymer that is produced is controlled by the molar ratio of the diol and diacid/anhydride and by the final acid number. Other diacids/anhydrides like terephthalic acid and phthalic anhydride can also be used as diluent in preparing the oxygen scavenging polymer. Examples of diols that can be used in preparing the oxygen scavenging polymer include 1,2-propanediol, ethylene glycol, neopentyl glycol, 2-methyl-1,3-propanediol, phenylmethanediol, phenylethanediol, 3-cyclohexene-1-methanediol, 3-cyclohexene-1-ethanediol, 4-cyclohexene-1,2-diol, and 3-cyclohexene-1, 1-dimethanol, among others, and 3-cyclohexene-1, 1-dimethanol is preferred.

Other embodiments of the present invention are directed to an oxygen scavenging composition that comprises at least one low molecular weight polymer and at least one oxygen scavenging vinyl crosslinker selected from cyclohexenyl methyl acrylate and cyclohexenyl methyl methacrylate. The cyclohexenyl groups of these crosslinkers are oxygen scavenging. "At least one low molecular weight polymer" includes a plurality of polymeric molecules that comprises a single type of polymer molecule or that comprises a mixture of different polymer molecules. Individual low molecular weight polymeric molecules of the "at least one low molecular weight polymer" comprise a polymeric backbone and at least two carbon-carbon double bonds in the backbone that are capable of reacting with the olefinic functional groups of the vinyl crosslinker. Preferably, the backbone carbon-carbon bonds that are capable of crosslinking are in the trans configuration. The low molecular weight polymer has a number average molecular weight between about 500 Mn and about 5000 Mn, and an acid number of between about 5 mg KOH/g and 50 mg KOH/g. In certain embodiments, the low molecular weight polymer does not comprise a cyclic organic moiety having 5 to 9 ring carbon atoms with at least one carbon-carbon double bond in its ring. The polymeric backbone of the low molecular weight polymer can be selected from polyesters.

A preferred low molecular weight polymer for used in such embodiments is the product of maleic anhydride and a diol, diacid, and/or dianhydride that does not comprise a cyclic organic moiety with a carbon-carbon double bond in its ring. Such low molecular weight polymers comprise a single type of carbon-carbon double bond, which is in the polymer backbone and that is introduced into the polymer through the maleic anhydride.

In this embodiment, the oxygen scavenging capacity of the crosslinked oxygen scavenging polymer is introduced through the cyclohexenyl methyl acrylate and cyclohexenyl methyl methacrylate crosslinkers which comprise an oxygen scavenging cyclic organic group, cyclohexene. Preferably, the oxygen scavenging crosslinker comprises between about 5 wt % and 80 wt % of the crosslinked oxygen scavenging composition.

The oxygen scavenging polymer and vinyl crosslinker used in producing crosslinked compositions of the present invention should be selected (1) to retain the greatest possible level of cyclic organic moieties intact (e.g. to not involve them in crosslinking) and (2) to yield the desired characteristics in the crosslinked composition that supports its intended function.

II. Vinyl Crosslinker

In preparing crosslinked compositions of the present invention, "at least one vinyl crosslinker" includes a plurality of crosslinkers, wherein the plurality can comprise a single type of vinyl crosslinker or a mixture of more than one type of vinyl crosslinker. The crosslinkers comprise at least two functional groups (e.g. olefinic groups) that are capable of reacting with the at least two backbone crosslinking functional groups of the oxygen scavenging polymer.

In oxygen scavenging crosslinked compositions that comprise a vinyl crosslinker, the vinyl crosslinker can be selected from styrene, divinyl benzene, methyl acrylate, cyclohexenyl methyl acrylate, cyclohexenyl methyl methacrylate, and methyl methacrylate. As stated above, the functional groups of vinyl crosslinker are olefinic. It is preferred that oxygen scavenging polymers crosslinked with vinyl crosslinkers comprise functional groups that are carbon-carbon double bonds in the backbone (e.g. olefinic groups, among others) that can react with the functional groups of the vinyl crosslinker. Oxygen scavenging polymers with a number average molecular weight between about 500 Mn and about 5000 Mn, and with an acid number of about between 5 mg KOH/g and about 50 mg KOH/g are preferred in crosslinked compositions that comprise vinyl crosslinkers. Oxygen scavenging polymers that are the reaction product of maleic anhydride and at least one diol, as described above, are particularly preferred for crosslinked compositions comprising vinyl crosslinkers. In certain vinyl crosslinking reactions of the present invention comprising an oxygen scavenging polymer and a vinyl crosslinker, a crosslinking catalyst can be used, such as an amine catalyst.

Furthermore, as discussed above, cyclohexenyl methyl acrylate and cyclohexenyl methyl methacrylate crosslinkers are oxygen scavenging crosslinkers that comprise a cyclic organic oxygen scavenging group, namely cyclohexene. These crosslinkers can be used to introduce additional oxygen scavenging capacity into a crosslinked oxygen scavenging composition. Oxygen scavenging crosslinked compositions of the present invention can be made by crosslinking low molecular weight polymers that do or do not comprise cyclic organic oxygen scavenging groups with these oxygen scavenging crosslinkers.

III. The Crosslinked Composition

In addition to the low molecular weight polymer (those with cyclic organic oxygen scavenging moieties or not) and the vinyl crosslinker, crosslinked compositions of the present invention can comprise at least one material selected from the following group: pigments, free radical initiators, antioxidants, crosslinking catalysts, and transition metal catalysts.

Preferably oxygen scavenging crosslinked compositions of the present invention comprise a transition metal catalyst. The transition metal catalyst can accelerate the rate of oxygen scavenging. Though not to be bound by theory, useful catalysts include those which can readily interconvert between at least two oxidation states. See Sheldon, R. A.; Kochi, J. K.; "Metal-Catalyzed Oxidations of Organic Compounds" Academic Press, New. York 1981.

Preferably, the catalyst is in the form of a salt, with the transition metal selected from the first, second or third transition series of the Periodic Table. Suitable metals and their oxidation states include, but are not limited to, manganese II or III, iron II or III, cobalt II or III, nickel II or III, copper I or II, rhodium II, III or IV, and ruthenium. The oxidation state of the metal when introduced need not necessarily be that of the active form. The metal is preferably iron, nickel, manganese, cobalt or copper; more preferably manganese or cobalt; and most preferably cobalt. Suitable counterions for the metal include, but are not limited to, chloride, acetate, stearate, palmitate, 2-ethylhexanoate, neodecanoate and naphthenate. Preferably, the salt, the transition metal, and the counterion are either on the U.S. Food and Drug Administration GRAS (generally regarded as safe) list, or exhibit substantially no migration from the composition (i.e. less than about 50 ppb in edible dietary intake (EDI)). Particularly preferable salts include cobalt oleate, cobalt stearate, and cobalt neodecanoate. The metal salt can also be an ionomer, in which case a polymeric counterion is employed. Such ionomers are well known in the art.

Typically, the amount of transition metal catalyst can range from about 0.001 to 1% (about 10 to 10,000 ppm) of the oxygen scavenging polymer, based on the metal content only (excluding ligands, counterions, etc.). The transition metal catalyst can be formed in the oxygen scavenging crosslinked composition or if the oxygen scavenging crosslinked composition is provided in a layer, the transition metal catalyst can be formed in a layer adjacent to it.

The crosslinked composition can further comprise an antioxidant. Antioxidants can be used with this invention to control scavenging initiation. An antioxidant as defined herein is a material, which inhibits oxidative degradation. Typically, antioxidants are added to facilitate the processing of polymeric materials or prolong their useful lifetime. In relation to this invention, such additives prolong the induction period for oxygen scavenging in the absence of initiation (by radiation exposure or heat exposure).

Antioxidants such as 2,6-di(t-butyl)-4-methylphenol (BHT), 2,2'-methylene-bis(6-t-butyl-p-cresol), triphenylphosphite, tris-(nonylphenyl)phosphite, dilaurylthiodipropionate, vitamin E, and tetra-bismethylene 3-(3,5-ditertbutyl-4-hydroxyphenyl)-propionate methane are suitable for use with this invention.

The amount of an antioxidant that can be present can also have an effect on oxygen scavenging. As mentioned earlier, such materials are usually present to prevent oxidation or gelation of the polymers. Typically, they are present in about 0.01 to 1% by weight. However, additional amounts of antioxidant can also be added if it is desired to tailor the induction period.

In general, oxygen scavenging compositions of the present invention will begin oxygen scavenging without deliberate action being taken to initiate oxygen scavenging. However the onset of oxygen scavenging without intervention can be days to weeks after the oxygen scavenging composition is produced. Initiation of oxygen scavenging in certain oxygen scavenging compositions can be achieved by exposure to radiation or heat. UV and/or visible light can be used with compositions that comprise photoinitiators to initiate oxygen scavenging. Similarly, exposure to microwave radiation can be used to initiate oxygen scavenging with compositions that comprise a microwave reactive material or with compositions that have been treated with a microwave reactive material. Still another method for initiating oxygen scavenging by certain crosslinked oxygen scavenging compositions is to expose them to heat. Therefore, certain oxygen scavenging compositions of the present invention further comprise an oxygen scavenging initiator, or a blend of different oxygen scavenging initiators. Oxygen scavenging initiators can be selected from photoinitiators and microwave reactive materials. Alternatively or in addition to initiation using UV or microwave radiation, they can be treated with heat to accelerate the onset of oxygen scavenging.

Suitable photoinitiators that can be used in the present invention are known in the art. Specific examples include, but are not limited to, benzophenone, o-methoxybenzophenone, acetophenone, o-methoxyacetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis(dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, α,α-diethoxyacetophenone, and α,α-dibutoxyacetophenone, among others. Singlet oxygen generating photosensitizers such as Rose Bengal, methylene blue, and tetraphenyl porphine can also be employed as photoinitiators. Polymeric initiators include poly(ethylene carbon monoxide) and oligo[2-hydroxy-2-methyl-1-[4-(1-methylvinyl)phenyl]propanone].

One class of photoinitiators that is especially useful in certain oxygen scavenging compositions includes benzophenone derivatives containing at least two benzophenone moieties, as described in copending U.S. patent application Ser. No. 08/857,325, filed May 16, 1997, incorporated herein by reference. These compounds act as effective photoinitiators to initiate oxygen scavenging activity in oxygen scavenging compositions. Such benzophenone derivatives have a very low degree of extraction from oxygen scavenging compositions, which can lead to reduced contamination of a packaged product by extracted photoinitiator.

A "benzophenone moiety" is a substituted or unsubstituted benzophenone group. Suitable substituents include alkyl, aryl, alkoxy, phenoxy, and alicylic groups contain from 1 to 24 carbon atoms or halides.

The benzophenone derivatives include dimers, trimers, tetramers, and oligomers of benzophenones and substituted benzophenones.

The benzophenone photoinitiators are represented by the formula

wherein X is a bridging group selected from sulfur; oxygen; carbonyl; —SiR$_2$—, wherein each R is individually selected from alkyl groups containing from 1 to 12 carbon atoms, aryl groups containing 6 to 12 carbon atoms, or alkoxy groups containing from 1 to 12 carbon atoms; —NR'—, wherein R' is an alkyl group containing 1 to 12 carbon atoms, an aryl group containing 6 to 12 carbon atoms, or hydrogen; or an organic group containing from 1 to 50 carbon atoms, preferably from 1 to 40 carbon atoms; m is an integer from 0 to 11; Y is a substituted or unsubstituted benzophenone group; and n is an integer from 2 to 12.

X can be a divalent group, or a polyvalent group with 3 or more benzophenone moieties. The organic group, when present, can be linear, branched, cyclic (including fused or separate cyclic groups), or an arylene group (which can be a fused or non-fused polyaryl group). The organic group can contain one or more heteroatoms, such as oxygen, nitrogen, phosphorous, silicon, or sulfur, or combinations thereof. Oxygen can be present as an ether, ketone, ester, or alcohol.

The substituents of Y, herein R", when present, are individually selected from alkyl, aryl, alkoxy, phenoxy, or alicylic groups containing from 1 to 24 carbon atoms, or halides. Each benzophenone moiety can have from 0 to 9 substituents.

Substituents can be selected to render the photoinitiator more compatible with the oxygen scavenging composition.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), or substituted benzoylated styrene oligomer. Tribenzoyl triphenylbenzene (BBP$^3$) and substituted tribenzoyl triphenylbenzene are especially preferred.

Another class of photoinitiators that can be especially useful in oxygen scavenging compositions includes long-wavelength UV-absorbers. These are defined as compounds that absorb UV light and have a wavelength of maximum absorption greater than about 350 nm.

Exemplary long-wavelength UV-absorbers include, but are not limited to, 2,4,6-trimethylbenzoyldiphenylphosphine oxide (commercially available as Lucirin TPO, BASF), ethyl-2,4,6-trimethylbenzoylphenylphosphinate (Lucirin TPO-L, BASF), isopropylthioxanthone, or bis(2,4,6- trimethylbenzoyl)phenylphosphineoxide (commercially available as Irgacure 819, Ciba). Preferred long-wavelength UV-absorbers are 2,4,6-trimethylbenzoyldiphenylphosphine oxide and bis(2,4,6-trimethylbenzoyl) phenylphosphineoxide.

The primary function of a photoinitiator is to enhance and facilitate the initiation of oxygen scavenging upon exposure to UV radiation. Due to the high cost of photoinitiators, it is desirable to use the minimum amount of photoinitiator required to achieve the desired level of enhanced initiation. This minimum amount will vary depending on the photoinitiator used, the wavelength and intensity of ultraviolet light used to initiate, the nature and amount of antioxidants used, the desired scavenging rate, the temperature, and the initial oxygen concentration and other factors. Preferably, when photoinitiator is used, it is either on the U.S. Food and Drug Administration GRAS (generally regarded as safe) list, or exhibits substantially no migration from the packaging article to the product (i.e. less than about 50 ppb in EDI). The amount of photoinitiator also depends on how the scavenging component is used. For instance, if the photoinitiator-containing component is placed underneath a layer, which is somewhat opaque to, the radiation used, or is less permeable to oxygen, more photoinitiator may be needed. For most purposes, however, the amount of photoinitiator, when used, will be in the range of 0.01 to 10% by weight of the total oxygen scavenging composition.

In certain embodiments, it can be desirable to heat the composition to initiate oxygen scavenging. Not to be bound by theory, it is thought that heating certain oxygen scavenging compositions of the present invention speeds the kinetics of the reaction that would normally lead to a slower onset of oxygen scavenging in the absence of exposure to a heat source. Thus, heating of the oxygen scavenging composition can be accomplished by methods known in the art, like blowing hot air on the composition.

Alternatively, oxygen scavenging compositions that comprise microwave reactive materials can be exposed to microwave radiation resulting in initiation of oxygen scavenging. A microwave reactive material can also be applied to the surface of an oxygen scavenging structure (e.g. a film or a packaging article) that comprises an oxidizable organic compound and a transition metal catalyst, and the treated structure can be exposed to microwaves. This in turn speeds the kinetics of the reaction leading to onset of oxygen scavenging by the structure.

The oxygen scavenging composition and microwave reactive material are exposed to microwave radiation, when it is desired to initiate oxygen scavenging. Microwave radiation of about 1 GHz to about 3 GHz can be used in conjunction with microwave reactive materials to initiate scavenging, microwave radiation of about 2.5 GHz is preferred.

It is preferred that the microwave reactive material be a material selected from the group consisting of metal materials and materials comprising polar compounds (i.e. water). Metal materials that can be used as microwave reactive materials in the present invention can be provided in the form of metal foils, metal powders, metal meshes, metal staples, metal buttons and metal fibers. When the microwave reactive material is provided as a metal powder it is preferred that it be comprised of a material selected from the group consisting of aluminum, copper, iron and oxides thereof. Examples of materials comprising polar compounds that can be used as microwave reactive material include water, peroxides and peroxide solutions. An oxygen scavenging composition can comprise a microwave reactive material, particularly metal powders, metal fibers, and peroxides, or the microwave reactive material can comprise part of or all of a material that is applied to the crosslinked oxygen scavenging composition.

Peroxide solutions can also be used as microwave reactive materials in certain embodiments of the present invention in which a microwave reactive material is applied to the surface of an oxygen scavenging composition that is provided in the form of a film or a packaging article. Typically, such peroxide solutions are aqueous solutions comprising about 2% to about 30% hydrogen peroxide. Water by itself can be used as a microwave reactive material in the present invention, particularly in certain embodiments in which a microwave reactive material is applied to the surface of an oxygen scavenging composition in the form of a film or a packaging article.

IV. Use of Crosslinked Oxygen Scavenging Polymer Compositions

Oxygen scavenging compositions of the present invention can be in the form of a coating on a surface of an article or as an adhesive joining two articles.

One embodiment of the present invention is a method of preparing a sprayable oxygen scavenging coating, as described above. A coating formulation can be prepared that comprises at least one oxygen scavenging polymer and at least one vinyl crosslinker as described above. Alternatively, a coating formulation can be prepared that comprises at least one low molecular weight polymer and at least one oxygen scavenging vinyl crosslinker as described above.

The coating formulation can in some cases require the use of at least one additional solvent to make the formulation, but it in some cases the crosslinker is itself a liquid or in solution. Thus, the coating formulation can in certain embodiments comprise at least one solvent selected from aliphatic hydrocarbons (like ketones, glycol ethers, alcohols, and esters) and aromatic hydrocarbons. Aliphatic hydrocarbon solvents that can be used include methyl isobutyl ketone and methyl ethyl ketone, among others. Examples of aromatic hydrocarbon solvents that can be used include xylene, toluene, and trimethyl benzene, among others. Furthermore, the coating formulation can further comprise at least one material selected from the following group: pigments, oxygen scavenging initiators, antioxidants, crosslinking catalysts and transition metal catalysts.

This coating formulation is applied to the desired surface and the coating is permitted to cure. The coating formulation can be applied to a surface by any of a number of methods known in the art. For example the coating formulation can be sprayed onto the surface, the surface can be dipped into the coating formulation, or the coating formulation can be brushed onto the surface. Preferably the coating formulation is cured at room temperature. Curing can take place in an oxygen-free environment or in an environment that comprises oxygen. In certain embodiments, the method further comprises initiating oxygen scavenging by the oxygen scavenging crosslinked composition by one of the methods described above.

A particular embodiment of a method for preparing a vinyl crosslinker solvent based coating includes dissolving a low molecular weight oxygen scavenging polyester with at least two olefinic crosslinking functional groups (e.g. reaction product of maleic anhydride and at least one diol, as described above) in styrene along with other components. Preferably the formulation used comprises about 25 wt % to about 50 wt % vinyl crosslinker (e.g., styrene or methyl methacrylate), about 100 ppm to about 500 ppm transition metal catalyst (e.g. cobalt oleate), about 10 ppm to about 100 ppm amine, as a crosslinking catalyst, and about 50 ppm to about 500 ppm of antioxidant. Such mixtures can be stored at less than about 10° C. for up to about three to six months before they are used. When the coating is to be prepared, about 0.1 wt % to about 1 wt % free radical initiator (e.g. crosslinking catalyst) is added to the mixture, and this is sprayed onto a surface and then cured. Curing can be performed at room temperature or at an elevated temperature.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

About 980 grams of maleic anhydride and about 1421 g cyclohexene dimethanol are charged into a 3 L reaction kettle equipped with an agitator, nitrogen sparge, thermal couple and partial condenser. Under nitrogen protection, the reactor is heated slowly and after the mixture begins to melt the agitator is engaged. The mixture is heated to 180° C. and water driven off by the heating is collected. After most of the water present in the mixture is collected and removed, the mixture is heated further to a temperature of between about 200° C. and about 210° C. Once the polymer is determined to have an acid number of less than about 40 mg KOH/g the reaction is stopped. The product is cooled to less than about 120° C., and then discharged slowly to a container containing cooled styrene (containing from about 50 ppm to about 500 ppm of an inhibitor like hydroquinone or 4-tert-butylcatechol) with mixing. The polymer is discharged into the mixing styrene at such a rate that the mixture's temperature is maintained at less than about 80° C. The polymer and styrene mixture is cooled to room temperature before addition of cobalt salt (e.g. cobalt octoate) and amine (dimethyl aniline). In this state the mixture could be stored at a temperature below about 10° C. for months. The formulation is sprayed on to various surfaces and allowed to cure. In certain tests it is cured at room temperature (e.g. 25° C.) and in others it is cured at a higher temperature. Upon curing a highly crosslinked rigid oxygen scavenging polymer coating is formed. During the curing, it is expected that the double bond from the maleic anhydride that becomes part of the polymeric backbone polymerizes with styrene to form a crosslink between polymer backbones, while most of the double bonds from the cyclohexene group remain unreacted, until they begin oxygen scavenging and are oxidized in the presence of the cobalt salt and oxygen.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. An oxygen scavenging composition comprising:
   at least one oxygen scavenging polymer that comprises (a) a polymeric backbone, having at least two backbone crosslinking functional groups that are carbon-carbon double bonds in the backbone; and (b) at least one cyclic organic moiety, wherein the cyclic organic moiety comprises a ring having from 5 to 9 carbon atoms, and at least one carbon-carbon double bond; and
   at least one vinyl crosslinker that comprises at least two functional groups that are capable of reacting with the backbone crosslinking functional groups of the oxygen scavenging polymer.

2. The composition of claim 1, wherein that at least one vinyl crosslinker is divinyl benzene.

3. The composition of claim 1, wherein the cyclic organic moiety is alicyclic or aromatic.

4. The composition of claim 3, wherein the cyclic organic moiety is cycloalkenyl.

5. The composition of claim 1, wherein the oxygen scavenging polymer is a polyester.

6. The composition of claim 1, wherein the polymeric backbone of the oxygen scavenging polymer comprises at least one carbon in the ring of the cyclic organic moiety.

7. The composition of claim 6, wherein the cyclic organic moiety has a formula selected from the formula (III) and (IV); wherein formula (III) is

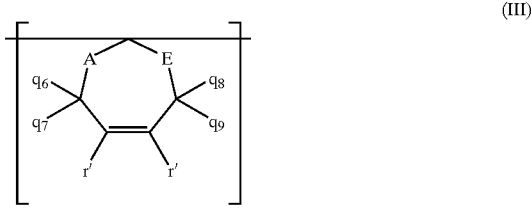

wherein A is $-(CR_5R_6)_g-$, g is an integer from 0 to 3, inclusive; wherein E is $-(CR_7R_8)_p-$, p is an integer from 0 to 3, inclusive; g+p≦3; wherein $q_6$, $q_7$, $q_8$, $q_9$, r', each $R_5$, each $R_6$, each $R_7$, and each $R_8$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents, and when r' is hydrogen, at least one of $q_6$, $q_7$, $q_8$, and $q_9$ is hydrogen; and wherein formula (IV) is

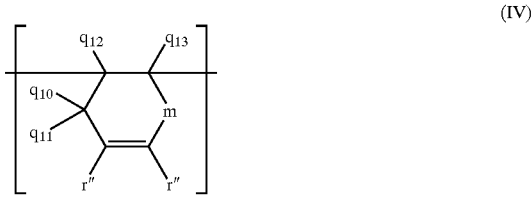

wherein m is $-(CR_9R_{10})_h(CR_{11}R_{12})_j-$, wherein the ring carbon adjacent to the double bond is bonded to $R_9$ and $R_{10}$, h is an integer from 0 to 1, inclusive, j is an integer from 0 to 3, inclusive, and when h+j≧1, h is 1; wherein $q_{10}$, $q_{11}$, $q_{12}$, $q_{13}$, r", $R_9$, $R_{10}$, each $R_{11}$, and each $R_{12}$ are independently selected hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents; and wherein when r" is hydrogen, at least one of $q_{10}$, $q_{11}$, $R_9$, and $R_{10}$ is hydrogen.

8. The composition of claim 1, wherein the cyclic organic moiety is pendant to the polymeric backbone of the oxygen scavenging polymer.

9. The composition of claim 8, wherein the pendant cyclic organic moiety has a formula selected from formula (I) and (II); wherein formula (I) is

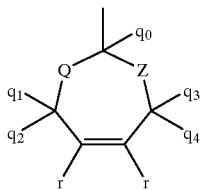

wherein Q is —$(CR_2R_3)_n$—, n is an integer from 0 to 3, inclusive; wherein Z is —$(CR_4R_5)_e$—, e is an integer from 0 to 3, inclusive; n+e≦3; wherein $q_0$, $q_1$, $q_2$, $q_3$, $q_4$, r, each $R_2$, each $R_3$, each $R_4$, and each $R_5$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents, and when r is hydrogen at least one of $q_1$, $q_2$, $q_3$, and $q_4$ is hydrogen; and wherein formula (II) is (II)

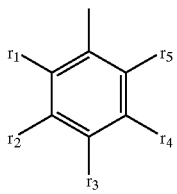

wherein $r_1$, $r_2$, $r_3$, $r_4$, and $r_5$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents.

10. The composition of claim 9, wherein the oxygen scavenging polymer further comprises a linking group linking the polymeric backbone and the pendant cyclic organic moiety, wherein the linking group is selected from the group consisting of $C_1$–$C_{12}$ alkyls, $C_1$–$C_{12}$ esters, $C_1$–$C_{12}$ ethers, $C_1$–$C_{12}$ silicones, and linking groups with the formula —$(CH_2)_z$—M—$(CH_2)_m$—, wherein M is a linkage comprising oxygen, nitrogen, sulfur, silicon, or any combination thereof, z is an integer from 0 to 12, inclusive, and m is an integer from 0 to 12, inclusive, provided that when one of z or m is 0, the other is at least 1.

11. The composition of claim 10, wherein the linking group is selected from

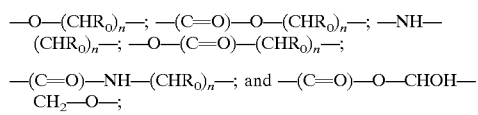

wherein $R_0$ is hydrogen, methyl, ethyl, propyl, or butyl; and n is an integer from 1 to 12, inclusive.

12. The composition of claim 1, wherein the oxygen scavenging polymer is the product of a reaction comprising maleic anhydride and at least one diol, wherein the oxygen scavenging polymer has a number average molecular weight between about 500 Mn and about 5000 Mn, and wherein the at least one cyclic organic moiety has a formula selected from the group consisting of formula (I), (II), (III), and (IV);

wherein in formula (I) Q is —$(CR_2R_3)_n$—, n is an integer from 0 to 3, inclusive; wherein Z is —$(CR_4R_5)_e$—, e is an integer from 0 to 3, inclusive; n+e≦3; wherein $q_0$, $q_1$, $q_2$, $q_3$, $q_4$, r, each $R_2$, each $R_3$, each $R_4$, and each $R_5$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents, and when r is hydrogen at least one of $q_1$, $q_2$, $q_3$, and $q_4$ is hydrogen;

wherein in formula (II) $r_1$, $r_2$, $r_3$, $r_4$, and $r_5$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents;

wherein in formula (III) A is —$(CR_5R_6)_g$—, g is an integer from 0 to 3, inclusive; wherein E is —$(CR_7R_8)_p$—, p is an integer from 0 to 3, inclusive; g+p≦3; wherein $q_6$, $q_7$, $q_8$, $q_9$, r', each $R_5$, each $R_6$, each $R_7$, and each $R_8$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents, and when r' is hydrogen, at least one of $q_6$, $q_7$, $q_8$, and $q_9$ is hydrogen; and wherein in formula (IV) m is —$(CR_9R_{10})_h(CR_{11}CR_{12})_j$—, wherein the ring carbon adjacent to the double bond is bonded to $R_9$ and $R_{10}$, h is an integer from 0 to 1, inclusive, j is an integer from 0 to 3, inclusive, and when h+j≧1, h is 1; wherein $q_{10}$, $q_{11}$, $q_{12}$, $q_{13}$, r", $R_9$, $R_{10}$, each $R_{11}$, and each $R_{12}$ are independently selected hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents; and wherein when r" is hydrogen, at least one of $q_{10}$, $q_{11}$, $R_9$, and $R_{10}$ is hydrogen.

13. The composition of claim 12, wherein the reaction further comprises cis-1,2,3,6-tetrahydrophthalic anhydride, and wherein the at least one cyclic organic moiety has the formula (IV), (IV)

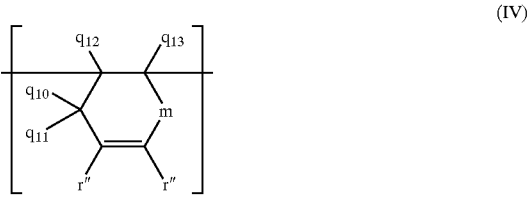

wherein m is —$(CR_9R_{10})_h(CR_{11}CR_{12})_j$—, wherein the ring carbon adjacent to the double bond is bonded to $R_9$ and $R_{10}$, h is 1, j is 0, wherein $q_{10}$, $q_{11}$, $q_{12}$, $q_{13}$, r", $R_9$, $R_{10}$, each $R_{11}$, and are each $R_{12}$ hydrogen.

14. The composition of claim 12, wherein the polymer comprises a pendant cyclic organic moiety having the formula (I) or (II);

wherein in formula (I) Q is —$(CR_2R_3)_n$—, n is an integer from 0 to 3, inclusive; wherein Z is —$(CR_4R_5)_e$—, e is an integer from 0 to 3, inclusive; n+e≦3; wherein $q_0$, $q_1$, $q_2$, $q_3$, $q_4$, r, each $R_2$, each $R_3$, each $R_4$, and each $R_5$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents, and when r is hydrogen at least one of $q_1$, $q_2$, $q_3$, and $q_4$ is hydrogen;

wherein in formula (II) is $r_1$, $r_2$, $r_3$, $r_4$, and $r_5$ are independently selected from hydrogen, linear $C_1$–$C_{20}$ alkyls, branched $C_1$–$C_{20}$ alkyls, cyclic $C_1$–$C_{20}$ alkyls, polycyclic $C_1$–$C_{20}$ alkyls, aromatic groups, halogens, and sulfur-containing substituents; and wherein the oxygen scavenging polymer further comprises a linking group linking the polymeric backbone and the pendant cyclic organic moiety, wherein the linking group is selected from the group consisting of $C_1$–$C_{12}$ alkyls, $C_1$–$C_{12}$ esters, $C_1$–$C_{12}$ ethers, $C_1$–$C_{12}$ silicones, and linking groups with the formula —$(CH_2)_z$—M—$(CH_2)_m$—, wherein M is a linkage comprising oxygen, nitrogen, sulfur, silicon, or any combination thereof, z is an integer from 0 to 12, inclusive, and m is an integer from 0 to 12, inclusive, provided that when one of z or m is 0, the other is at least 1.

15. The composition of claim 14, wherein the linking group is selected from

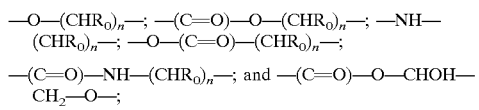

—(C=O)—NH—$(CHR_0)_n$—; and —(C=O)—O—CHOH—$CH_2$—O—;

wherein $R_0$ is hydrogen, methyl, ethyl, propyl, or butyl; and n is an integer from 1 to 12, inclusive.

16. The composition of claim 12, wherein the oxygen scavenging polymer has an acid number of between about 5 mg KOH/g and about 50 mg KOH/g.

17. The composition of claim 1, further comprising at least one transition metal catalyst.

18. The composition of claim 17, wherein the transition metal catalyst is selected from the group consisting of cobalt oleate, cobalt stearate, and cobalt neodecanoate.

19. The composition of claim 1, further comprising at least one antioxidant.

20. The composition of claim 1, further comprising at least one oxygen scavenging initiator.

21. The composition of claim 20, wherein the initiator is capable of being activated by heat or by radiation.

22. The composition of claim 1, further comprising a crosslinking catalyst.

23. The composition of claim 1, wherein the composition is in the form of a coating.

24. The composition of claim 1, wherein the composition has adhesive properties.

25. An oxygen scavenging composition comprising,
at least one crosslinked oxygen scavenging polymer that comprises a polymeric backbone, at least one cyclic organic moiety, wherein the cyclic organic moiety comprises a ring having from 5 to 9 carbon atoms, and at least one carbon-carbon double bond, and
wherein the crosslinked polymer is the product of a reaction of (a) at least one low molecular weight oxygen scavenging polymer that has a number average molecular weight between about 500 Mn and about 5000 Mn, and (b) at least one vinyl crosslinker,
wherein the low molecular weight oxygen scavenging polymer comprises a polymeric backbone having at least two backbone crosslinking functional groups that are carbon-carbon double bonds in the backbone, and at least one cyclic organic moiety that is the same cyclic organic moiety of the crosslinked polymer; and
wherein the vinyl crosslinker comprises at least two functional groups that are capable of reacting with the backbone crosslinking functional groups of the low molecular weight oxygen scavenging polymer.

26. The composition of claim 25, wherein the vinyl crosslinker is divinyl benzene.

27. The composition of claim 25, wherein the cyclic organic moiety is alicyclic or aromatic.

28. The composition of claim 27, wherein the cyclic organic moiety is cycloalkenyl.

29. The composition of claim 25, wherein the uncrosslinked oxygen scavenging polymer is a polyester.

30. The composition of claim 25, wherein the polymeric backbone of the uncrosslinked oxygen scavenging polymer comprises at least one carbon in the ring of the cyclic organic moiety.

31. The composition of claim 25, wherein the cyclic organic moiety is pendant to the polymeric backbone of the uncrosslinked oxygen scavenging polymer.

32. The composition of claim 31, wherein the uncrosslinked oxygen scavenging polymer further comprises a linking group linking the polymeric backbone and the pendant cyclic organic moiety.

33. The composition of claim 25, further comprising at least one material selected from the group consisting of pigments, oxygen scavenging initiators, antioxidants, crosslinking catalysts, and transition metal catalysts.

34. The composition of claim 25, wherein the composition is an oxygen scavenging coating that is sprayed onto a surface.

35. A crosslinked oxygen scavenging composition comprising:
a low molecular weight polymer, and
at least one oxygen scavenging vinyl crosslinker selected from cyclohexenyl methyl acrylate and cyclohexenyl methyl methacrylate,
wherein the low molecular weight polymer comprises a polymeric backbone and at least two carbon-carbon double bonds in the backbone capable of reacting with the oxygen scavenging vinyl crosslinker, and wherein the low molecular weight polymer has a number average molecular weight between about 500 Mn and about 5000 Mn.

36. The composition of claim 35, wherein the low molecular weight polymer is a polyester.

37. The composition of claim 35, wherein the low molecular weight polymer has an acid number of between about 5 mg KOH/g and 50 mg KOH/g.

38. The composition of claim 35, further comprising at least one transition metal catalyst.

39. The composition of claim 38, wherein the transition metal catalyst is selected from the group consisting of cobalt oleate, cobalt stearate, and cobalt neodecanoate.

40. The composition of claim 35, further comprising at least one antioxidant.

41. The composition of claim 35, further comprising at least one oxygen scavenging initiator.

42. The composition of claim 41, wherein the initiator is capable of being activated by heat or by radiation.

43. The composition of claim 35, further comprising a crosslinking catalyst.

44. The composition of claim 35, wherein the composition is in the form of a coating.

45. The composition of claim 35, wherein the composition has adhesive properties.

* * * * *

UNITED STATES PATENT AND TRADEMARK OFFICE
CERTIFICATE OF CORRECTION

PATENT NO.    : 6,572,783 B1
DATED         : June 3, 2003
INVENTOR(S)   : Gangfeng Cai, Ta Yen Ching and Hu Yang It is certified that error appears in the above-identified patent and that said Letters Patent is hereby corrected as shown below:

Column 16,
Line 20, delete "that" and insert -- the --.

Signed and Sealed this

Twenty-third Day of September, 2003

JAMES E. ROGAN
*Director of the United States Patent and Trademark Office*